United States Patent [19]

Bishop

[11] 4,161,380
[45] Jul. 17, 1979

[54] INJECTION MOLDING PROCESS CONTROL

[75] Inventor: Thomas G. Bishop, Mt. Gilead, Ohio

[73] Assignee: HPM Corporation, Mt. Gilead, Ohio

[21] Appl. No.: 880,453

[22] Filed: Feb. 23, 1978

Related U.S. Application Data

[62] Division of Ser. No. 516,501, Dec. 21, 1974.

[51] Int. Cl.$^2$ .............................................. B29F 1/06
[52] U.S. Cl. ..................................... 425/145; 425/149
[58] Field of Search ............... 425/145, 149; 264/40.1, 264/328, 329

[56] References Cited

U.S. PATENT DOCUMENTS

| | | | |
|---|---|---|---|
| 2,786,234 | 3/1957 | Byer | 264/329 |
| 3,642,404 | 2/1972 | Nagawa | 425/145 |
| 3,666,141 | 5/1972 | Ma | 425/145 X |
| 3,726,334 | 4/1973 | Sallberg | 425/145 X |
| 3,741,700 | 6/1973 | Hutchinson | 425/149 X |
| 3,784,657 | 1/1974 | Hutchinson | 264/40.6 X |
| 3,840,312 | 10/1974 | Paulson | 425/149 |
| 3,859,400 | 1/1975 | Ma | 264/40.1 |
| 4,066,725 | 1/1978 | Boettner | 264/40.1 |

Primary Examiner—Thomas P. Pavelko

Attorney, Agent, or Firm—Albert L. Jeffers; John F. Hoffman

[57] ABSTRACT

Both a method and apparatus are disclosed for controlling a cyclically operated injection molding machine such that uniform, high quality molded articles are repeatedly produced from plasticized synthetic resinous material. The method and apparatus include integration of a sensed injection pressure with respect to time from the beginning of an injection stroke until plasticized material in a mold reaches a predetermined pressure. The integration defines a work index which is compared with a preset allowable range. If the work index lies outside the preset range, an adjustment is made to the back pressure acting on the plasticizing screw during the plasticizing portion of the subsequent molding cycle. The apparatus is permitted to make a predetermined number of adjustments in the back pressure after which a suitable indication is made that the molding apparatus is out of control itself. Other viscosity-affecting parameters may be controlled including injection screw rotary speed and injection screw velocity, and barrel temperature of the plasticizing apparatus. A mold cavity pressure sensor indicates that the cavity is full, and thereupon stops the integration and may also reduce the injection pressure to a lower value, sufficient to supply additional material to compensate for shrinking due to cooling, yet not high enough to introduce strains, or cause flashing.

12 Claims, 2 Drawing Figures

INJECTION MOLDING PROCESS CONTROL

This is a division of application Ser. No. 516,501 filed Dec. 21, 1974.

BACKGROUND OF THE INVENTION

The invention is generally concerned with the automatic control of injection molding machines. More specifically, this invention relates to a control for an injection molding machine in which a work-indicative parameter is integrated with respect to time during the injection of plasticized material into a mold thus defining a work index which is used to control the molding machine.

In the past it has been common to employ monitoring systems and controls in injection molding apparatus. Typically, a monitor comprises apparatus for recording specified variables during each cycle of the injection molding apparatus. Such monitoring systems, however, require manual changes to be made by an operator to obtain consistently uniform products. Ordinarily, the operator reviews the recorded variables for consecutive molding cycles and then makes an appropriate adjustment to the injection molding apparatus such that acceptable products are likely to be obtained.

Control systems comprise another type of automatic control for injection molding machines. Typically, control systems sense one or more parameters which are considered to be necessarily associated with the injection molding of uniform, high quality products. Each of the sensed parameters is compared with a specified range within which the parameter must lie in order to give acceptable products. If a sensed parameter lies outside of its allowable range, a feedback system is ordinarily provided to make a compensating adjustment to an operating parameter of the injection molding machine.

With monitoring systems and their reliance on human operators, there is a substantial likelihood that a large number of non-uniform, or low quality products may be molded before the injection molding apparatus can be brought within acceptable limits. It is noted in passing that unacceptable products generate excessive manufacturing costs and waste costly plastic materials.

Control systems, by comparison, substantially reduce the number of unacceptable products by automatically making compensatory adjustments when necessary. As noted above, control systems typically sense particular parameters and maintain those parameters within specified limits. While some such controls are useful, there has persisted a need for a truly practical one capable of maintaining product quality even in the face of variations in feed stock and ambient conditions. Feed stock of synthetic resinous material varies from one batch to another and frequently contains varying proportions of virgin and reground material. Both of those characteristics may adversely affect product quality. Ambient temperature is still another variable which can affect the operation of injection molding apparatus and product quality. The above are but a few of the variables which can affect the molded parts and the minimum range which may be specified for the sensed parameters.

Aside from the variables which affect the minimum range for the sensed parameters, there remains the problem of which parameter or parameters are to be sensed as being the most representative of a quality product. A myriad of such parameters have been proposed for use heretofore, including many of the operating parameters of the injection molding apparatus such as injection ram velocity, melt temperature, melt pressure, hydraulic injection pressure, injection time interval, mold pressure, etc.

Some molding process controls have employed sensing devices to indicate when a mold cavity is filled to a specified pressure. Such sensing devices have been used to shift molding apparatus from an injection portion to a holding portion of the molding cycle. In addition such sensing devices have been used as an indication of product quality.

It has also been proposed to indicate product quality by an integral of work-parameter integrated with respect to time between positions at the beginning and the end of a ram stroke. Typically, the selected positions have been indicated by using a linear position potentiometer. This integral has been fraught with difficulty, however, since the end or bottom of a ram stroke is variable from cycle to cycle. Accordingly, a physically fixed position for the end of the stroke may allow significant product quality variations between consecutive mold cycles.

The use of mold pressure sensors alone has, likewise, been problematic. More specifically, there may be a sink region in the mold or an excessively packed region. In addition, other parameters of the molding apparatus may manifest quality-affecting excursions which are not reflected in the selection of mold pressure.

It is therefore apparent that these previously used parameters have not been altogether satisfactory for controlling injection molding apparatus.

BRIEF SUMMARY OF THE INVENTION

It is therefore an object of the present invention to provide a novel injection molding process control which derives an index correlatable with product quality over a range of variations of conditions and uses this index to regulate the operation of an injection molding machine.

In accordance with a preferred embodiment of the present invention, hydraulic injection pressure, which translates a plasticizing screw to inject a quantity of molten material into a mold, is integrated with respect to time during the injection portion of each molding cycle and until a predetermined pressure is attained by molten material accumulating in the mold cavity. This integration yields a work index which is indicative of the work required to inject the molten material throughout the injection portion of the cycle and thereby represents the net effect of all viscosity perturbations during injection. In addition the integration automatically responds to variations of material properties, to machine or mold variations and to ambient conditions, all of which may affect sequential molding cycles. The integration limits used here also obviate the effect of vagaries in the physical length of each injection stroke and the precise physical position where the injection stroke ends by eliminating reliance thereon.

The integration preferably ends simultaneously with the occurrence of a selected mold cavity pressure such that the combination of the work index and the selected mold cavity pressure assure the repetitive molding of consistently uniform products. By placing a mold cavity sensor at an extremity of the cavity, the sensor is also effective to indicate that the mold has been filled which is also a requirement for consistent product quality.

Having obtained an index of the work expended, the index is compared with an adjustable pre-set allowable range therefor. This comparison permits a continuous evaluation of injection apparatus performance during consecutive molding cycles while also making possible a record of molding machine operation. In the event that the index does not fall within the allowable range, the comparison may be used to generate a signal to adjust an appropriate parameter of the molding machine.

When the index for a particular cycle does not lie within the allowable range, a compensating adjustment is made to a viscosity-affecting parameter such as hydraulic back pressure exerted on the plasticizing screw during the plasticizing portions of a cycle. The adjustment is made for subsequent cycles and thus compensates for all viscosity perturbations of the previous cycle. Moreover, this adjustment procedure accommodates gradual changes in slowly changing variables such as ambient temperature in addition to relatively rapid fluctuations which may result from changes in material composition.

Another feature that may be incorporated into the process control of the present invention provides a predetermined number of molding cycles within which the index is permitted to seek a value within the allowable range. If the index does not adjust itself within the number of cycles, an appropriate indication may be made to signal that the machine is out of control. This feature may be particularly advantageous in applications where a single operator is charged with simultaneously monitoring several molding machines.

With some work-affecting parameters, it may be advantageous to delay corrective changes so that spurious changes are not made in response to occasional erratic calculations of the work index. Accordingly, the present invention may also be provided with a delay circuit which postpones any change until a selected number of consecutive cycles require change.

BRIEF DESCRIPTION OF THE DRAWINGS

Other features of the present invention will be apparent to those skilled in the art when the appended claims are read in light of the following description and the drawings in which:

DETAILED DESCRIPTION OF THE INVENTION

Figure 1:
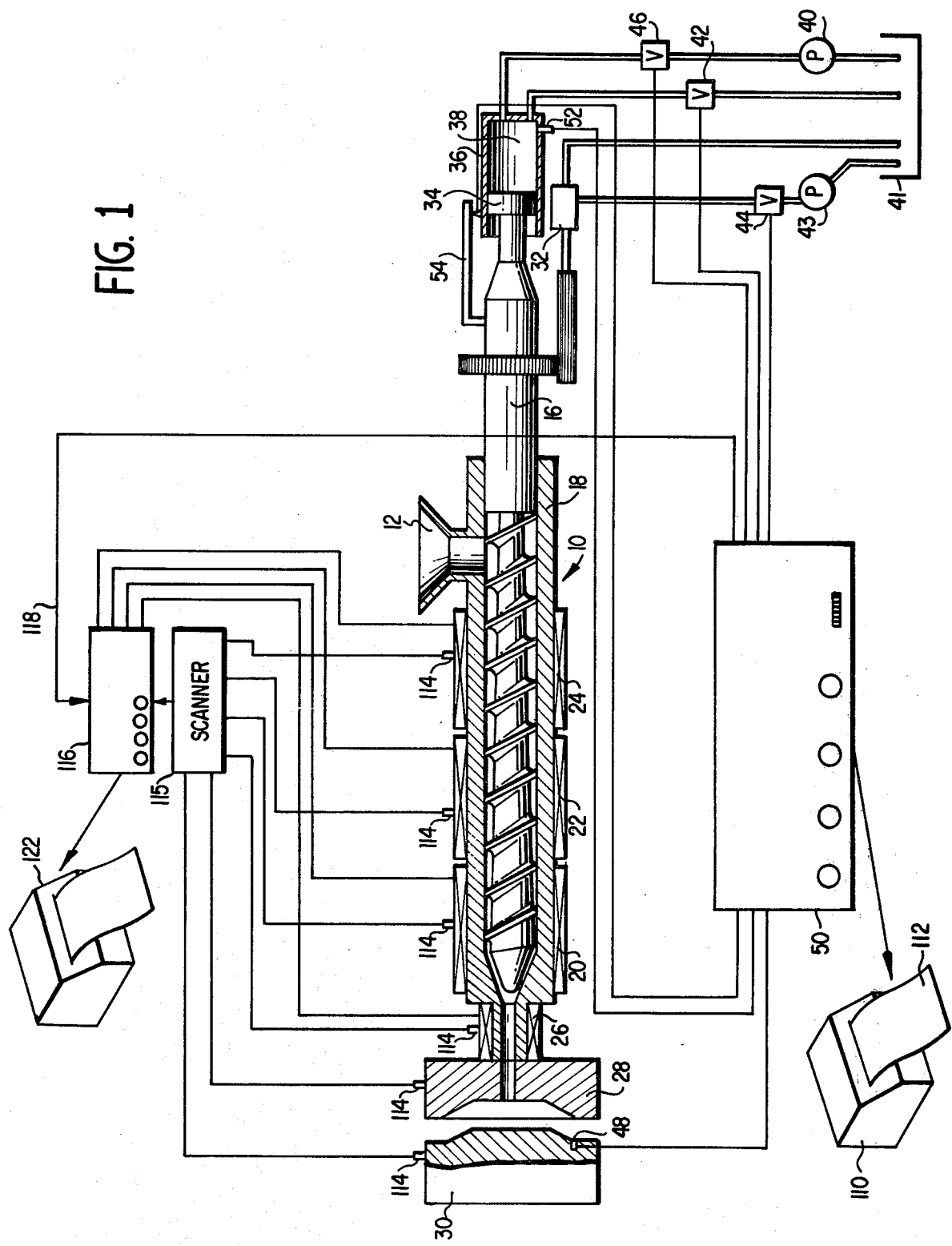
FIG. 1 is a diagrammatic view, in partial cross section, of an injection molding machine connected to a process control according to the present invention.

Depicted in FIG. 1 is a cyclically operated injection molding apparatus comprising plasticizing apparatus 10, a suitable mold and a process control 50. The plasticizing apparatus 10 includes a hopper 12 which receives particulate synthetic resinous material for delivery to a reciprocable rotary screw 16 that is mounted internally of a barrel 18 wherein the material is plasticized and pressurized. Wrapped around the external circumference of the barrel 18 are a plurality of band heating elements 20, 22, 24. At the outlet end of the barrel 18, a nozzle section is provided which includes an external band heating element 26.

The nozzle section of the barrel 18 communicates with a mold comprising a stationary mold portion 28 and a movable mold portion 30. The stationary mold portion 28 and the movable mold portion 30 cooperate to define a mold cavity therebetween into which plasticized material is injected from the plasticizing apparatus 10 such that a molded article or product results.

At the end of the screw 16 opposite from the mold, suitable apparatus is provided to both rotate and reciprocate the screw 16 relative to the barrel 18. More specifically, a screw drive motor 32 is provided to impart rotary motion to the screw 16 during a plasticization portion of a molding cycle. In addition, the screw 16 is provided with a piston end 34 which is mounted internally of a cylinder member 36 such that a chamber 38 is defined therebetween. The chamber 38 is supplied with pressurized hydraulic fluid from a reservoir 41 through a suitable pump 40.

The pump 40 provides a high pressure high volume flow of hydraulic fluid to the chamber 38 to reciprocate the screw 16 during an injection portion of the molding cycle, and supplies a low volume low pressure flow of hydraulic fluid to the chamber 38 during a holding portion of the molding cycle. Communicating with the chamber 38 and a reservoir 41 is a suitable back pressure control 42 which provides a variable adjustment of the back pressure acting in the chamber 38. The back pressure control 42 may comprise a conventional electric relief valve.

To control the flow of hydraulic fluid from the pump 40 to the chamber 38, a control valve 46 is preferably provided. The valve 46 may comprise a conventional electric control valve and is operable to control both the volume and pressure of hydraulic fluid in chamber 38.

As illustrated in FIG. 1, a second pump 43 may be provided to supply hydraulic fluid to the hydraulic motor 32 which rotates the screw 16. A suitable screw speed control 44 is provided between the pump 43 and the hydraulic motor 32 for regulating the speed thereof. The screw speed control 44 may be a conventional electric flow control valve.

The mold cavity between mold portions 28, 30 is provided with a suitable sensing means 48 which is preferably disposed at an extremity of the mold cavity remote from the plasticizing apparatus 10. The mold cavity pressure sensor 48 measures the pressure of plasticized material which has been injected into the mold. Moreover, by positioning the sensor 48 at an extremity, the sensor 48 ensures that the sensed pressure represents the pressure in a filled mold cavity. The pressure sensing means 48 is operable to generate a signal representing plasticized material pressure and to communicate this material pressure signal to the process control apparatus 50.

The chamber 38 includes an injection pressure sensing means 52 which generates a signal that is indicative of the hydraulic pressure in the chamber 38. This injection pressure signal from the pressure sensing means 52 is also input into the process control apparatus 50. The reciprocating screw 16 may also be provided with an integration-initiating position transducer 54 which indicates the position of the screw 16 with respect to the barrel 18. The linear position transducer 54 provides an input signal for the process control apparatus 50.

Figure 2:
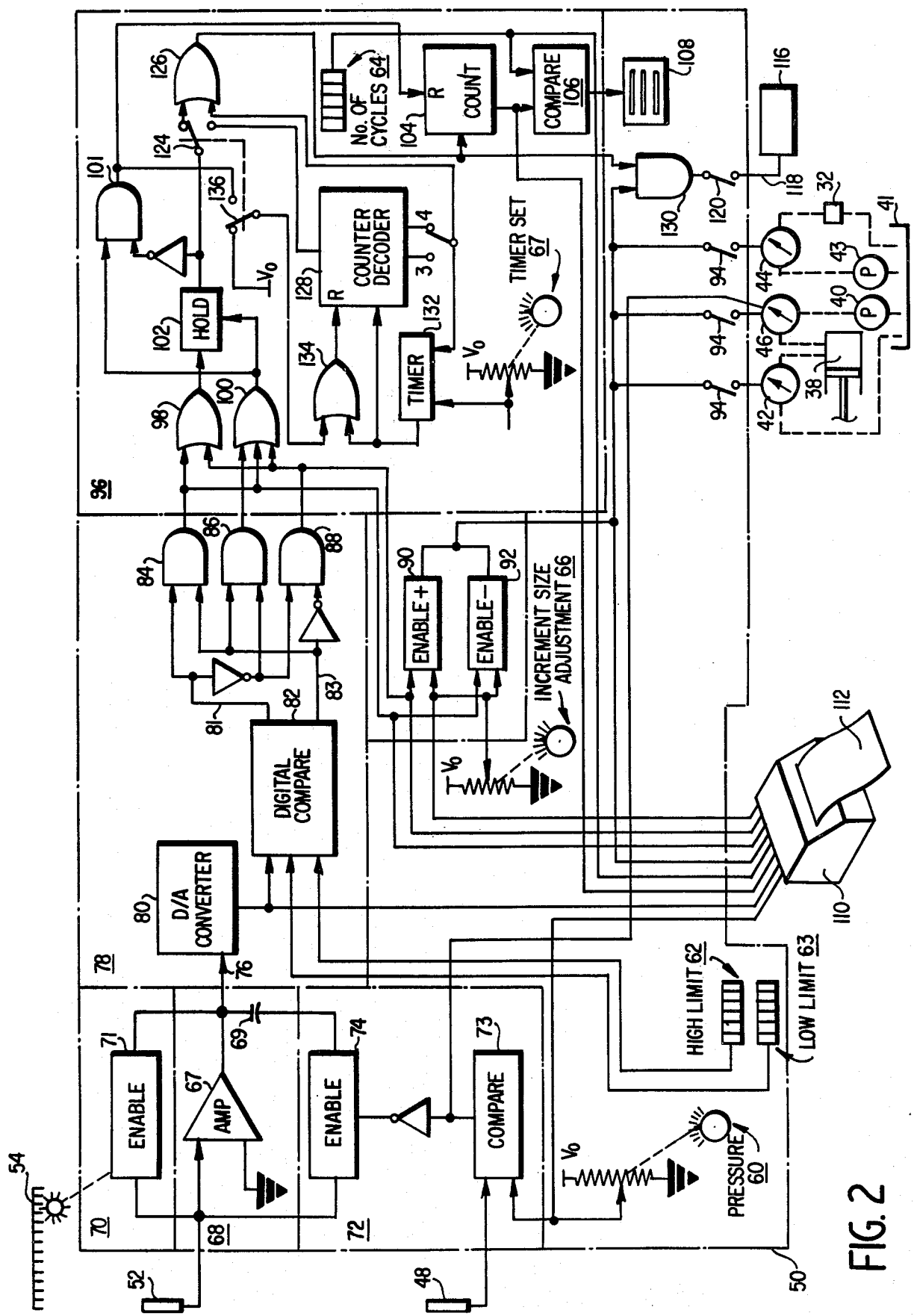
FIG. 2 is a diagrammatic illustration of the control system.

Turning now to FIG. 2, the process control apparatus 50 includes a settable selected mold cavity pressure input 60 that establishes a predetermined pressure which is to be attained by plasticized material within the mold cavity. A predetermined allowable range for a work index is input to the process control apparatus 50 by setting a high limit 62 and a low limit 63.

An out-of-control input 64 enters a predetermined number of consecutive molding cycles within which the control apparatus 50 is expected to bring the work index calculated for each cycle within the range specified by the limits 62, 63. In the event that the control apparatus 50 fails to bring the work index within the specified allowable range within the predetermined number of cycles, a suitable alarm means 108 may be provided to summon assistance from an operator.

An increment size adjustment 66 specifies the magnitude of an incremental change which is to be made in a viscosity-affecting parameter for subsequent molding cycles in the event that the work index does not lie within the specified allowable range therefor. Preferably, increment size adjustment 66 specifies a percentage change which is to be made.

The process control apparatus 50 may also include a selectively operable time delay circuit having a timer with a variable adjustment 67. The time delay circuit may be used to postpone incremental changes in a viscosity affecting parameter when desired.

In operation, the injection molding cycle may be considered in three portions: a plasticizing portion, an injection portion and a holding portion. During the plasticizing portion, particulate material (see FIG. 1) is introduced through the hopper 12 to the screw 16. The screw compacts, compresses, heats and plasticizes the particulate, synthetic resinous material while it is conveyed forwardly along the length of the screw 16. The band heaters 20, 22, 24 around the barrel 18 may transfer additional heat to the plasticized material and facilitate the plasticization thereof.

As the plasticized material accumulates at the left end of the screw 16 as seen from FIG. 1, the plasticized material develops a fluid pressure acting upon the end of the screw, which tends to translate or reciprocate the plasticizing screw 16 to the right. To resist the tendency of the plasticizing screw 16 to translate in response to the accumulating plasticizing material, hydraulic back pressure is exerted on the piston end 34 from the chamber 38. By controlling the back pressure in the chamber 38, the pressure in the plasticized material accumulated in the screw and the barrel 18 may be controlled.

The back pressure acting on the screw 16 is conventionally known to have a significant effect on the amount of work required during injection, and on the viscosity of the plasticized material accumulated between the screw 16 and the barrel 18. Accordingly, the back pressure exerted on the plasticizing screw 16 is a viscosity affecting parameter of the plasticizing apparatus 10 which has a potent effect on the viscosity of the material plasticized therein.

When a sufficient volume of plasticized material, or "shot", has been accumulated in the plasticizing apparatus 10, the injection portion of the molding cycle may commence. A high volume high pressure flow of hydraulic fluid from pump 40 is introduced into the chamber 38. The plasticizing screw 16 is then translated to the left (see FIG. 1) with respect to the barrel 18 thereby discharging or expressing the shot of plasticized material which had been accumulating therein. The shot is thus injected into the mold cavity defined between the stationary mold portion 28 and the movable mold portion 30 to form the molded article.

The transition between the plasticizing portion of the cycle and the injection portion of the cycle may be indicated by using a preselected positon of the integration-initiating position transducer 54. The preselected position may be adjustable such that material in gates of the mold is cleared before the preselected position is reached by the position transducer 54.

Typically, the injection portion continues until the mold cavity is filled with plasticized material and until the plasticized material in the mold attains a specified pressure. With the present invention, the end of the injection period is signaled when the mold cavity sensor 48 attains the predetermined value input at 60.

While the material in the mold is solidifying, a suitable holding pressure must be maintained, to accommodate for material shrinkage in the mold which frequently occurs, if uniform, high quality articles are to be molded consistently. Accordingly, the third portion of the molding cycle, the holding portion begins when the mold pressure has attained the selected value. During the holding portion, a low volume low pressure flow of hydraulic fluid is maintained in the chamber 38. The change in flow volume and pressure between the injection portion and the holding portion may be triggered by the mold cavity pressure sensor 48.

The holding portion of the molding cycle continues until the plasticized material injected into the mold has solidified sufficiently for an article to be removed from the mold. Thereupon, the plasticizing portion of the cycle is initiated and continues as discussed above. During the plasticizing portion, the movable mold portion 30 may be withdrawn from association with the stationary mold portion 28 such that the article can be removed therefrom. The mold cavity portions 28, 30 then return to their abutting relationships such that the mold cavity is closed and is ready to receive the next shot of plasticized material from the plasticizing apparatus 10.

Turning now to FIG. 2, the operation of the process control apparatus 50 may be more readily visualized. The pressure sensing means 52 senses hydraulic injection pressure in the chamber 38 and provides a pressure-related input signal to an integrator 68 which may comprise an operational amplifier 67 having a capacitive feedback network 69. The integrator 68 integrates the injection pressure signal with respect to time and preferably begins at the inception of the injection portion of the cycle.

An initiator 70, which operates in response to the integration-initiating position transducer 54, may be used to signal the integrator 68 to begin. Typically the initiator may comprise an enabling circuit 71 such as a switch connected in parallel with the integrator 68. As the plasticizing screw 16 of FIG. 1 begins an injection stroke in response to an increased injection pressure in the chamber 38, the position transducer 54 will encounter the preselected position and then signal the integrator 68 through the initiator 70 (FIG. 2) to commence the integration of injection pressure with respect to time.

The integration of injection pressure preferably continues throughout the injection portion of the molding cycle until a stop signal is communicated to the integrator 68 from a comparator 72. The comparator 72 compares the pressure set by input 60 with a signal communicated to an analog comparator circuit 73 by the mold cavity material pressure sensing means 48.

When the mold cavity pressure attains the predetermined value, an enabling circuit 74 is inhibited by a binary signal from the comparator circuit 73 to stop the integration process. Simultaneously, the comparator circuit 73 signals the valve 46 to shift to its low pressure low volume flow position.

The output 76 of the integrator 68 constitutes an index of work performed on the plasticized material in the shot during the injection thereof into the mold and until the mold is filled with plasticized material to a predetermined pressure. More specifically, the time integral of hydraulic pressure acting on the piston end 34 of the plasticizing screw 16 (see FIG. 1) during the time a shot of material is injected into the mold is a measure of the work required to overcome the flow resistance of the plasticized material and to inject the shot into the mold. It is noted that viscosity is a measure of the resistance of a fluid to internal flow and the work required to inject the shot into the mold therefore may represent the apparent viscosity of the material injected. By integrating the work required to inject a shot into the mold throughout the entire injection portion of the molding cycle, any perturbations affecting the injection stroke or the viscous fluid flowing into the mold cavity are accounted for. Moreover, by continuing the integration until a specified pressure is developed in the material injected into the mold cavity, a full mold with uniformly compacted material is ensured. As the most influential parameters on product quality have been found to be material pressure and the work required to fill the mold with material, the combination of the calculated work index and specified pressure enables the process control apparatus to consistently and effectively produce high quality molded articles. It should also be apparent that making calculations during fractional periods of the injection portion of the molding cycle may not provide an index as reliable as the index used here.

Having calculated a work index for the injection portion of the molding cycle, the index is evaluated by comparator logic 78 (see FIG. 2) to determine whether or not it lies in the predetermined allowable range which is input to the process control apparatus 50 through the limits 62, 63. If the work index lies within the specified range, the injection molding apparatus is operating within allowable constraints and no control adjustments are required. On the other hand, if the work index lies outside of the allowable range, a command signal is generated by the comparator 78 to change a viscosity-affecting parameter through suitable feedback means.

The comparator logic 78 includes a suitable conventional analog to digital converter 80 which preferably converts the integrator output 76 into a binary coded decimal (BCD) signal. The BCD signal is then compared with the input high and low limits 62, 63 in a suitable conventional digital comparator 82 having a high output signal 81 and a low output signal 83. The digital comparator 82 generates a high or binary one signal in the high output 81 if the calculated work index 76 is greater than the high limit 62. Similarly, the digital comparator 82 generates a high or binary one signal in the low output 83 if the calculated work index exceeds the low limit 63.

A series of three suitable gates and inverting circuits are provided in the comparator logic 78 to determine whether the work index 76 is above, within, or below the predetermined allowable range set by the input limits 62, 63. For example, a first AND gate 84 passes a command signal when both output signals 81, 83 are binary one and thus indicates that the index is above the allowable range. A second AND gate 86 passes a signal when the work index 76 exceeds the low limit 63 but does not exceed the high limit 62 and thus indicates the index is within the predetermined allowable range. The third AND gate 88 passes a command signal when both output signals 81, 83 are binary zero and therefore indicates that the calculated work index is below the allowable range.

The command signals from the first and third AND gates 84, 88 are electrically communicated to a pair of enabling circuits 90, 92 which also receive a signal from the increment size adjustment 66. The enabling circuit 90 passes a command expected to increase a viscosity-affecting parameter of the plasticizing apparatus in response to the command signal from the third AND gate 88. The enabling circuit 92 passes a command signal expected to decrease a viscosity-affecting parameter in response to the command signal from the first AND gate 84. For example, the enabling circuits 90, 92 may each comprise a suitable amplifier inhibited by a high binary signal level and enabled by a low binary signal level. The enabling circuit 90 may pass the signal from the increment size adjustment when enabled while the enabling circuit 92 may pass an inverted or negative form of this signal when enabled.

The command signal from either enabling circuit 90, 92 is communicated to one or more of the valves 42, 44, 46 through appropriate manually preset switches 94. As noted above, the valves 42, 44, 46 control the viscosity-affecting parameters of back pressure, injection pressure and screw rotation speed, respectively.

The signal from each of the three AND gates 84, 86, 88 is supplied to another comparator logic 96 which counts the number of consecutive molding cycles in which viscosity corrections occur and compares that count to the allowable number of cycles input by the input 64.

The comparator logic 96 includes two OR gates 98, 100 which receive signals from the AND gates 84, 86, 88. The first OR gate 98 is connected to the first and third AND gates 84, 88 such that it will pass a signal whenever a command signal emanates from the first comparator logic 78. The second OR gate 100 issues a shift signal for each molding cycle since it operates regardless of the value of the work index as determined by the AND gates 84, 86, 88.

To provide pulses for a conventional, resettable COUNT circuit 104, a conventional HOLD circuit 102 is connected to both OR gates 98, 100. The OR gate 98 passes a pulse which is retained by the HOLD circuit 102 whenever the work index is not within the allowable range at the end of each cycle. The OR gate 100 passes a signal for each molding cycle which instructs the HOLD circuit 102 to shift the stored pulse out and shift the new pulse, if any, in from the OR gate 98. The HOLD circuit 102 may be any suitable circuit for sampling and holding an input quantity in response to a shift signal. The COUNT circuit 104 may be any suitable binary counter having a reset input terminal R.

In the event there is no pulse stored in the HOLD circuit 102, such as when the work index is within the allowable range, then the COUNT circuit 104 is reset to zero through an inverter connected to an AND gate 101 which, in turn, is connected to the reset terminal R. The AND gate 101 also receives an input signal directly from the OR gate 100 so that the COUNT circuit 104 is reset only when there is a shift signal and no pulse stored in the HOLD circuit. When the work index lies outside the allowable range and pulses are stored during consecutive cycles, the COUNT circuit 104 accumulates the number of consecutive cycles.

A compare circuit 106 is connected to the COUNT circuit 104 and evaluates the number from the COUNT circuit 104 with respect to the allowable number of cycles input by thumbwheel 64. If the number of cycles counted exceeds the allowable preset number, a signal is sent to a suitable indicator 108 which may comprise an audible alarm that warns an operator the molding apparatus is out of control. Since the signals from the COUNT circuit and the thumbwheel 64 may be binary in nature, the compare circuit 106 may be any suitable conventional circuit for comparing two signals representing binary numbers.

The signals representing various input parameters, the computed work index and other parameters of the process control apparatus 50 may be supplied to a suitable recorder 110 which may provide a printed record 112 thereof for each molding cycle. For example, a conventional pen or chart type recorder or a recorder providing a digital record may be utilized for this purpose.

Yet another viscosity-affecting parameter which may be controlled by the process control apparatus 50 is the temperature of the barrel 18 (see FIG. 1). For this purpose a plurality of temperature sensors 114 may be provided at various locations along the barrel 18, the nozzle and on each mold portion 28, 30. The output from each of the temperature sensors 114 may be selectively scanned by a scanner 115 and then compared with a preset temperature in comparator 116 which may receive a signal from the process control apparatus 50 as illustrated at 118. The comparator 116 may be selectively activated by a switch 120 of the process control apparatus 50 (see FIG. 2) and may also provide a printed record through a second suitable recorder 122 of the type previously described (see FIG. 1). When a temperature adjustment is necessary, the comparator 116 may generate output signals to suitable solid state silicon controlled rectifiers which control the band heaters 20, 22, 24, 26 provided along the barrel 18. In this manner, the temperature of the barrel 18 may be controlled in response to the calculated work index generated in the process control apparatus 50.

Where temperature is selected as a viscosity-affecting parameter, it may be desirable to include a suitable delay circuit to inhibit temperature changes until the work indexes calculated for each of several consecutive cycles are outside the predetermined allowable range thereby confirming that an error trend exists. To enable the delay circuit, a suitable conventional switch 124 (see FIG. 2) interposed between the HOLD circuit 102 and OR gate 126 is moved to its second position. The OR gate 126 passes a signal to the COUNT circuit 104 when the switch 124 is in either its first or its second position.

With the delay circuit enabled, signals from the HOLD circuit 102 enter a suitable conventional counter-decoder 128 having a reset terminal R and an output for selecting either 3 or 4 as the number of molding cycles which are to be delayed. The counter-decoder 128 counts pulses from the HOLD circuit 102, decodes the current count, and passes a binary pulse from the output to the OR gate 126 when the selected number of consecutive cycles has been attained.

The OR gate 126 passes a pulse to the COUNT circuit 104, as noted above, and to an input of AND gate 130. A second input of the AND gate 130 receives a signal from the enabling circuits 90, 92. Accordingly, a temperature adjustment will be permitted by the AND gate 130 only when the selected number of cycles has occurred.

The counter-decoder output signal is also communicated to a time delay means which may comprise a suitable conventional timer circuit 132 having the settable input 67. The counter-decoder output signal enables the timer circuit 132 which generates an output pulse to inhibit the counter-decoder 128 for the period of time set by input 67. When the set period of time expires, the counter-decoder 128 is again operative to count consecutive cycles during which the work index is outside the allowable range. Accordingly, the time delay means allows a reaction time period before further temperature adjustments may be made.

The timer output pulse is also communiated to an input of an OR gate 134. A second input of the OR gate 134 is connected to a suitable conventional two position switch 136 which operates as a slave with the switch 124. The OR gate 134 is connected to the reset terminal R of the counter-decoder 128 such that the counter-decoder 128 is reset whenever the OR gate 134 receives an appropriate reset pulse.

The first position of switch 136 is connected to a voltage source Vo. Accordingly, the counter-decoder will always be reset at zero when the switch 124 is in its first position. When the switch 124 is moved to its second position to enable the delay circuit, the switch 136 is moved to its second position by virtue of the slave relationship. In the second position, the switch 136 receives any reset pulse emanating from the AND gate 101 for the COUNT circuit 104. Since the switch 134 is connected to the OR gate 134, the counter-decoder 128 is also reset along with the COUNT circuit 104. In addition, the counter-decoder 128 is reset when the selected number of consecutive cycles is attained by virtue of the input to the OR gate 134 from the timer circuit 132.

The process control apparatus 50, illustrated in FIG. 1, is shown separated from the plasticizing apparatus 10 in the interest of clarity. In practice it is desirable to mount the process control apparatus 50 on the plasticizing apparatus. In addition, the process control apparatus 50 may generate binary-coded decimal output signals which are directly compatible with computer storage and control.

Thus, it is apparent that there has been provided in accordance with this invention, an injection molding process control which substantially satisfies the objects set forth above. Although the present invention has been described in conjunction with a specific embodiment thereof, it is evident that many alternatives, modifications, variations and equivalents will be apparent to those skilled in the art in light of the foregoing disclosure. Accordingly, it is expressly intended that all such alternatives, modifications, variations and equivalents which fall within the spirit and scope of this invention as defined in the appended claims be embraced thereby.

What is claimed is:

1. In an automatically controlled injection molding apparatus having a process control means for producing uniform, high quality articles from synthetic resinous material, the improvement comprising:
material pressure sensing means for sensing the pressure of plasticized synthetic resinous material in the mold;

injection pressure sensing means for sensing the pressure of hydraulic fluid during the injection portion of the molding cycle;

integration means operable to integrate the work parameter of the injection molding apparatus during the injection portion of the molding cycle to obtain a work index;

initiating means for starting the integration means approximately with the inception of the injection portion of the molding cycle; terminating means for stopping the integration means when the material pressure sensing means indicates a predetermined value; and feedback means for making a compensatory adjustment in a viscosity-affecting parameter of the molding apparatus during subsequent molding cycles thereof and being activated by a signal from said process control means in response to the value of the work index.

2. The apparatus of claim 1 wherein said process control means includes means for indicating failure to restore a work index within a predetermined allowable range within a set number of consecutive molding cycles.

3. The apparatus of claim 1 wherein the feedback means makes a predetermined adjustment in the back pressure acting on a plasticizing screw during the plasticization portion of subsequent molding cycles.

4. The apparatus of claim 1 wherein said process control means includes means operable in response to the terminating means for shifting from the injection portion to the holding portion of the molding cycle.

5. Apparatus for cyclically controlling an injection molding machine during injection molding of uniform, high quality articles from synthetic resinous material, comprising:

first sensing means for generating a first signal representing pressure of synthetic resinous material in a mold;

second sensing means for generating a second signal representing a work parameter;

adjustment means for changing a viscosity-affecting parameter of subsequent cycles in response to a command signal; and process control means for controlling a molding cycle having a plasticizing portion, an injection portion and a holding portion, the process control means including an integrator for generating a work index by integrating said second signal with respect to time during said injection portion until said first signal attains a predetermined value, a comparator for determining if the work index is within the predetermined allowable range, and means for generating an appropriate command signal to said adjustment means when the work index is outside the predetermined allowable range, whereby the failure of the work index to lie within the predetermined allowable range effects a variation in the plasticizing portion of subsequent cycles such that the work index of subsequent cycles will more likely fall within the predetermined allowable range.

6. The apparatus of claim 5 wherein said process control means includes:

cycle counter means for counting the number of consecutive cycles in which the work index is outside the predetermined allowable range being operable to generate a call signal when the work index is outside the predetermined allowable range for a predetermined number of consecutive cycles; and indicator means operable in response to the call signal for indicating failure of the work index to be within the allowable range after the predetermined number of consecutive cycles.

7. The apparatus of claim 6 wherein said first sensing means includes a pressure transducer positioned at an extremity of the mold.

8. The apparatus of claim 6 wherein said second sensing means senses injection pressure acting on a plasticizing screw.

9. The apparatus of claim 8 wherein said adjustment means effects an incremental change in back pressure acting on the plasticizing screw during the plasticizing portion of the molding cycle.

10. The apparatus of claim 9 wherein the process control means includes a settable predetermined allowable range for the work index, a settable predetermined value for the first signal, a settable number of allowable consecutive cycles, and a settable incremental change for the viscosity-affecting parameter.

11. The apparatus of claim 5 wherein said process control means includes inhibiting means for delaying changes in a viscosity-affecting parameter for a selected number of cycles to eliminate changes induced by erratic command signals.

12. The apparatus of claim 5 wherein said process control means includes a time delay means for allowing a reaction time period to expire before further changes are made to the viscosity-affecting parameter.

* * * * *